UNITED STATES PATENT OFFICE.

EUGENE EMIL PIERRE JEAN PRUDENT SÉVILLE JANSEN DE ST. LAURENT, OF TWICKENHAM, ENGLAND, ASSIGNOR TO THE ALUMINUM SOLDER CO., LIMITED, A COMPANY OF GREAT BRITAIN.

MANUFACTURING SOLDER.

1,338,966.  Specification of Letters Patent.  Patented May 4, 1920.

No Drawing. Application filed September 22, 1916, Serial No. 121,611. Renewed November 11, 1919. Serial No. 337,332.

*To all whom it may concern:*

Be it known that I, EUGENE EMIL PIERRE JEAN PRUDENT SÉVILLE JANSEN DE ST. LAURENT, a subject of the King of Belgium, and a resident of Twickenham, in the county of Middlesex, England, have invented a new and useful Improvement in Manufacturing Solder, of which the following is a specification.

This invention relates to solder used for uniting metals and alloys, especially aluminium and its alloys, and has for its object to provide an improved solder and a process for manufacturing same.

According to my invention the solder which consists of tin and zinc, is prepared in the following manner:

The constituents, which have very different fusing points, are melted in separate crucibles with the following precautions. Each crucible employed should be a new one of plumbago and should be used for no other purpose than the herein described process. In particular, no foreign metals or alloys should, under any circumstances, be melted in it.

Before using the crucible it should be well annealed as by inverting it over the top of a furnace.

The crucible should afterward be lined with a paste consisting of:—

70 parts of aluminium oxid,
20 parts of carbon, preferably charcoal.

These ingredients should be mixed with water to form a paste with which the walls, and particularly the bottom of the crucible should be well lined. The lining should be well dried until the interior of the crucible becomes a grayish white. The crucible is lined in the manner above described in order to prevent any chemical reaction being brought about by the metals coming in contact with the walls of the crucible. To prevent oxidation the crucibles should be covered with lids while the melting process is going on; or the metal may be covered with a layer of carbon, preferably charcoal, with the same object. The ingredients used should be as pure as practicable, preferably of chemical purity.

The molten metals are poured together into a fresh crucible with the precautions above described. The mixture is then well stirred with an iron rod covered with plumbago, and poured into chilled or other suitable molds, preferably of plumbago faced with talc.

The proportions of the constituent metals which I have found useful are as follows:—

*Medium solder.*

2 kilos tin.
5 kilos zinc.

It is advisable to prepare the solder in large quantities so as to minimize oxidation and the amount of dross in pouring.

The improved solder may be used in the customary manner in connection with a blow pipe, soldering iron or the like. No flux need be used nor is any special preliminary preparation necessary. Generally speaking the most satisfactory results are secured when a minimum amount of solder is employed to effect the joint.

What I claim is:—

1. The method of making solder which consists in lining suitable crucibles with aluminum oxid and carbon, then melting separately in such crucibles zinc and tin, then pouring molten zinc from one crucible and molten tin from another crucible into a third crucible treated as above set forth, then stirring the mixture in said third crucible and then pouring the same into molds.

2. The method of making solder which consists in lining suitable crucibles with aluminum oxid and carbon, in proportions of approximately 70 parts of aluminum oxid and 20 parts of carbon, then melting separately in such lined crucibles zinc and tin in proportions of 2 kilos of tin and 5 kilos of zinc, then pouring the molten zinc from one crucible and the molten tin from another crucible into a third crucible treated as above set forth, then stirring the mixture in said third crucible and then pouring the same into molds.

3. The method of making solder which consists in lining suitable plumbago crucibles with aluminum oxid and carbon in the form of charcoal, then melting separately in such lined crucibles zinc and tin, then pouring molten zinc from one crucible and molten tin from another crucible into a third crucible treated as above set forth in the proportions of 2 kilos of tin to 5 kilos of zinc, then stirring the mixture in said third crucible and then pouring the same into molds.

4. The method of making solder which consists in making a paste of aluminum oxid and carbon and enough water to make a paste of proper consistency (paste consisting of approximately 70 parts of aluminum oxid and 20 parts of carbon), then lining suitable plumbago crucibles with such paste, then drying such crucibles and lining, then melting separately in such lined and dried crucibles zinc and tin, then pouring molten zinc from one crucible and molten tin from another crucible into a third crucible treated as above set forth in the approximate proportions of 2 kilos of tin to 5 kilos of zinc, then stirring the molten mixture in said third crucible and then pouring the same into molds.

In testimony whereof I have hereunto subscribed my name this second day of September, 1916.

EUG. EM. PIER. JEAN PR. SÉVILLE JANSEN DE ST. LAURENT.